United States Patent [19]

Hill

[11] 3,873,050

[45] Mar. 25, 1975

[54] ATTITUDE SENSING METHOD AND APPARATUS

[75] Inventor: Maynard L. Hill, Silver Spring, Md.

[73] Assignee: The Johns Hopkins University, Baltimore, Md.

[22] Filed: Oct. 29, 1973

[21] Appl. No.: 410,391

[52] U.S. Cl............. 244/77 R, 317/262 E, 324/32, 324/72, 318/584, 318/585, 340/27 AT
[51] Int. Cl.......................................... B64c 13/18
[58] Field of Search...... 244/1 A, 1 SA, 77 R, 77 D, 244/77 E, 164, 171; 317/2 E, 262 E; 324/32, 72; 340/27 AT, 248; 318/584, 585, 648, 489

[56] References Cited
UNITED STATES PATENTS

| | | | |
|---|---|---|---|
| 2,454,630 | 11/1948 | Buckthal | 324/72 |
| 3,482,235 | 12/1969 | Johnson | 324/72 X |
| 3,525,866 | 8/1970 | Sakalyn et al. | 244/1 SA |
| 3,611,127 | 10/1971 | Vosteen | 324/72 |
| 3,719,337 | 3/1973 | Gardner | 244/77 D |

Primary Examiner—Trygve M. Blix
Assistant Examiner—Stephen G. Kunin
Attorney, Agent, or Firm—Robert E. Archibald; Kenneth E. Darnell

[57] ABSTRACT

A method and apparatus for utilizing the earth's static electric field as a reference for generating an information-bearing electrical signal. In a particular embodiment, the invention provides a static voltmeter having a single voltage sensing probe which is referenced to a ground connection for determining the difference in voltage between the probe and "ground" in an object, such as an aircraft, carrying the probe. The probe senses the static voltage in the vertically-oriented electrostatic gradient in the earth's atmosphere, this sensed voltage being compared to the potential at the ground connection to indicate the orientation of the probe relative to ground. A change in vertical orientation of the probe relative to the ground connection produces a voltage signal which is proportional to the magnitude of the difference in vertical orientation between the probe and the ground connection, this signal being utilizable in a known fashion to stabilize the aircraft or other object relative to the earth's surface.

12 Claims, 2 Drawing Figures

ATTITUDE SENSING METHOD AND APPARATUS

STATEMENT OF GOVERNMENT INTEREST

The invention herein described was made in the course of or under a contract with the Department of the Navy.

BACKGROUND AND SUMMARY OF THE INVENTION

The existence of a static electric field in the earth's atmosphere has long been recognized. More recently, this static electric field was determined to exhibit a vertical potential gradient, the change in potential per meter decreasing with increasing altitude. At any altitude, however, equipotential lines and planes are essentially horizontal, especially in a localized area. The ability to define a horizontal equipotential line or plane in the atmosphere would provide a reference for aircraft stabilization, gyroscopic drift correction, or clear air turbulence detection inter alia. Additionally, detection of tilted equipotential planes or lines in the vicinity of various physical objects provides a reference for obstacle avoidance apparatus.

In particular, the present invention provides related methods and preferred means for utilizing the static field existing in the earth's atmohspere to obtain a reference signal which can be employed to control both pitch and roll axes stabilization of airborne vehicles. In a more general sense, the invention provides method and means for continuously defining an equipotential line or plane within the earth's vertical static potential gradient. Definition of this equipotential line or plane is indicated by a simple DC voltage signal produced by the preferred apparatus of the invention, this signal being usable to accomplish a variety of functions. The method comprises immersion of at least one voltage sensing probe in the earth's static potential gradient and measuring the difference in the static voltage sensed by the probe and the voltage existing at a ground connection on the object carrying the probe. Taking a zero potential difference between the voltage sensed by the probe and the effective potential at ground to be that situation where a given axis of the object carrying the probe is horizontal, the object will be found to lie on a horizontal line of equal potential due to the vertical nature of earth's static potential gradient. Similarly, a horizontal equipotential plane may be defined by two of the voltage sensing probes, each of which is referenced to the ground connection or to what will become known hereinafter as the "electrostatic center" of the object carrying the probes. Nonhorizontal equipotential planes and lines may be sensed in similar fashion in those areas where the vertical gradient is distorted due to physical objects or ionization sources.

The preferred apparatus of the present invention comprises voltage sensing probes (which probes may be comprised of radioactive material in order to increase the electrical contact thereof with the atmosphere) and a voltmeter or current meter. The voltmeter receives the sensed potential from the probe and the ground connection and then measures the difference therebetween to produce a voltage difference signal which may be utilized to control servomechanical or other apparatus. The actual or effective combination of two static voltmeters can essentially define an equipotential plane in the earth's vertical static potential gradient. Since this equipotential plane is defined within a relatively small space, the plane is essentially horizontal and may be used as a reference plane for aircraft stabilization inter alia.

If the sensing probe described above is attached to a wingtip of an aircraft or essentially along the transverse axis thereof, then the voltage difference between the probe and the ground connection measured by the voltmeter is a function of the roll angle of the aircraft. Similarly, the voltage difference sensed by a probe disposed essentially along the longitudinal axis of an aircraft is a function of the pitch angle of the aircraft. The differential voltage output signals thus produced for the pitch and roll orientations of the aircraft can be used to drive a servomechanical system to maintain the aircraft in level flight relative to the surface of the earth. The sensing probes need not be exactly aligned with or parallel to the transverse or longitudinal axes of the aircraft in order to produce useful information. Similarly, the probes need not be positioned at exactly the same elevation relative either to the earth's surface or to the horizontal axis of the aircraft.

Thus it is an object of the invention to provide a method and apparatus for continuously defining an equipotential line or plane in the earth's static electric field.

It is another object of the invention to provide differential voltage sensing apparatus aboard an airborne vehicle, the differential voltage sensed by said apparatus being a function of the roll or pitch attitude angle of the vehicle.

Further objects and advantages of the invention will become more readily apparent in light of the following detailed description.

DESCRIPTION OF THE PREFERRED EMBODIMENTS

Figure 1:
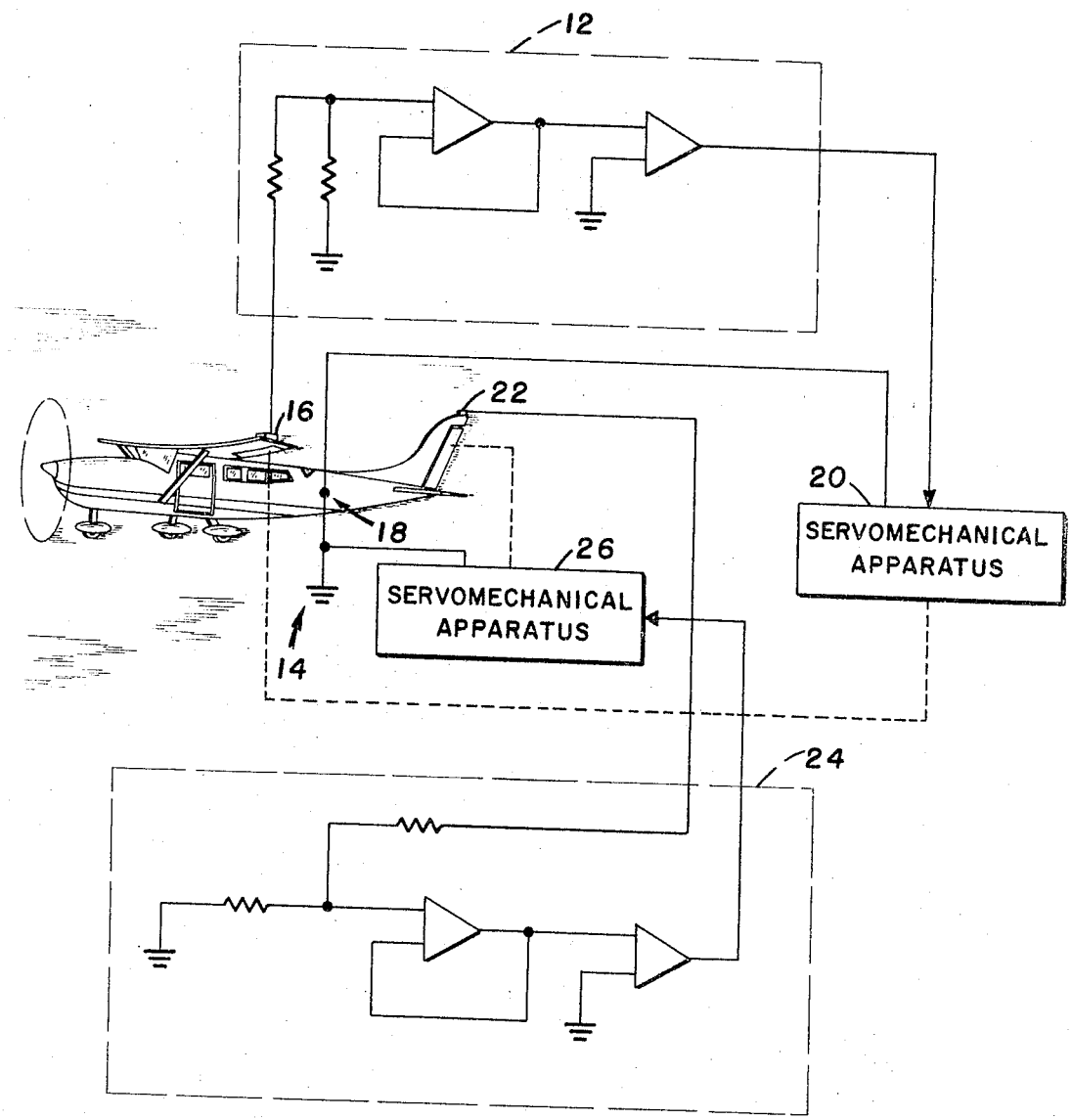
FIG. 1 is a schematic view of static voltmeters mountable on an aircraft for use in stabilizing said aircraft about its "roll" and "pitch" axes; and, FIG. 2 is a schematic view of a current meter mountable on an aircraft for use in stabilizing said aircraft along its "roll" axis.

The several embodiments of the invention use the earth's static potential gradient as a reference for generating an information-bearing electrical signal. The generated signal may then be used to perform a variety of functions, particularly valuable functions being the stabilization or detection of the attitude of an airborne vehicle. The invention essentially provides a static voltmeter comprised of a single voltage sensing probe and a simple voltmeter. The sensing probe is referenced to a ground connection in the object carrying the probe, the object usually being an aircraft or other airborne vehicle. The simple voltmeter measures the difference in potential between the voltage sensed by the probe and the referenced voltage at the ground connection. The voltage at the ground connection obtains from an effective measurement of the average potential of the airborne object or aircraft with respect to the ambient electrostatic field. This average potential may be refered to as an "electrostatic center" and is related to the geometry of the airborne object. This "electrostatic center" is analogous to terms used to define aerodynamic properties such as "center of lift" or "center of lateral area." The "electrostatic center" in an aircraft appears to be near the "center of lateral area" of the aircraft, i.e., in the middle of the fuselage, and tends to shift slightly with changes of orientation of the aircraft in the electrostatic field of the atmosphere.

Stabilization of an aircraft along an axis thereof and relative to the earth's surface is accomplished by determining the difference in voltage between the probe an this "electrostatic center," the voltage at the electrostatic center being provided to the simple voltmeter through a ground connection located at any convenient position in or on the aircraft. In order to stabilize an aircraft about its roll axis, a sensing probe is disposed on a wingtip of an aircraft to allow reference of the voltage sensed by the probe to the ground connection, the ground connection exhibiting a voltage directly related to the "electrostatic center" of the aircraft. A zero difference in voltage between that potential sensed by the probe and that potential exhibited by the "electrostatic center" is taken as an alignment of the roll axis (or pitch axis if the probe is disposed on the fuselage of the aircraft) of the aircraft with an equipotential line in the electrostatic field. For purposes of this disclosure, the roll axis is taken to be the transverse axis of the vehicle or a line parallel thereto. Similarly, the pitch axis of the vehicle is taken to be the longitudinal axis of the aircraft. A difference in voltage between the probe and the "electrostatic center" indicates that the probe is either above or below the "electrostatic center," the axis of the aircraft associated with the position of the probe thereby not being aligned with an equipotential line and, generally speaking, not being stabilized horizontally relative to the surface of the earth. This voltage difference may be used to generate a signal proportional to the misalignment of the aircraft axis with the surface of the earth, the signal being used to operate well-known servomechanical apparatus to stabilize the aircraft.

In FIG. 1, an aircraft 10 is stabilized in "roll" by the use of a voltmeter shown at 12. The voltmeter 12 is referenced to a ground connection at 14, which connection may be physically made at any desired location on the aircraft. A voltage sensing probe 16 is attached to the aircraft 10 at one of the wingtips thereof and is electrically connected to the voltmeter 12. Thus, the voltmeter 12 has a voltage input from the probe 16 and references this input to the voltage exhibited by the ground connection 14, this ground connection 14 essentially having the voltage characteristics of an "electrostatic center," this "center" being a hypothetical point on the aircraft which represents the average potential of the entire aircraft with respect to the ambient electrostatic field. The "electrostatic center" is represented schematically at 18 in the drawings. If the probe 16 is moved vertically relative to the electrostatic center 18, a voltage signal proportional to the difference in relative altitude between the probe 16 and center 18 is produced by the voltmeter 12. The signal thus produced can then be used to drive well-known servomechanical apparatus 20 for operating aircraft control surfaces to bring the aircraft 10 to a desired roll attitude. The probe 16 may be placed either along the wing of the aircraft 10 or at a point spaced from the fuselage of the aircraft and located along a transverse axis of the aircraft. Stabilization of the aircraft 10 about the pitch axis, or longitudinal axis, of the aircraft is similarly accomplished, the probe 16 being placed on the aircraft along the longitudinal axis thereof, such as on the tail of the aircraft as shown at 22 in FIG. 1. The probe 22 is electrically joined to a second voltmeter 24 which is also referenced to the ground connection at 14 which exhibits the effective potential of the aircraft represented by the electrostatic center 18. The output of the voltmeter 24 can be used to drive servomechanical apparatus 26 for operating aircraft control surfaces to bring the aircraft 10 to a desired pitch attitude. Alternately, the outputs of the respective voltmeters 12 and 24 may be used to indicate on a meter or other readout device the degree of attitude misalignment within the electrostatic field in the atmosphere.

Figure 2:
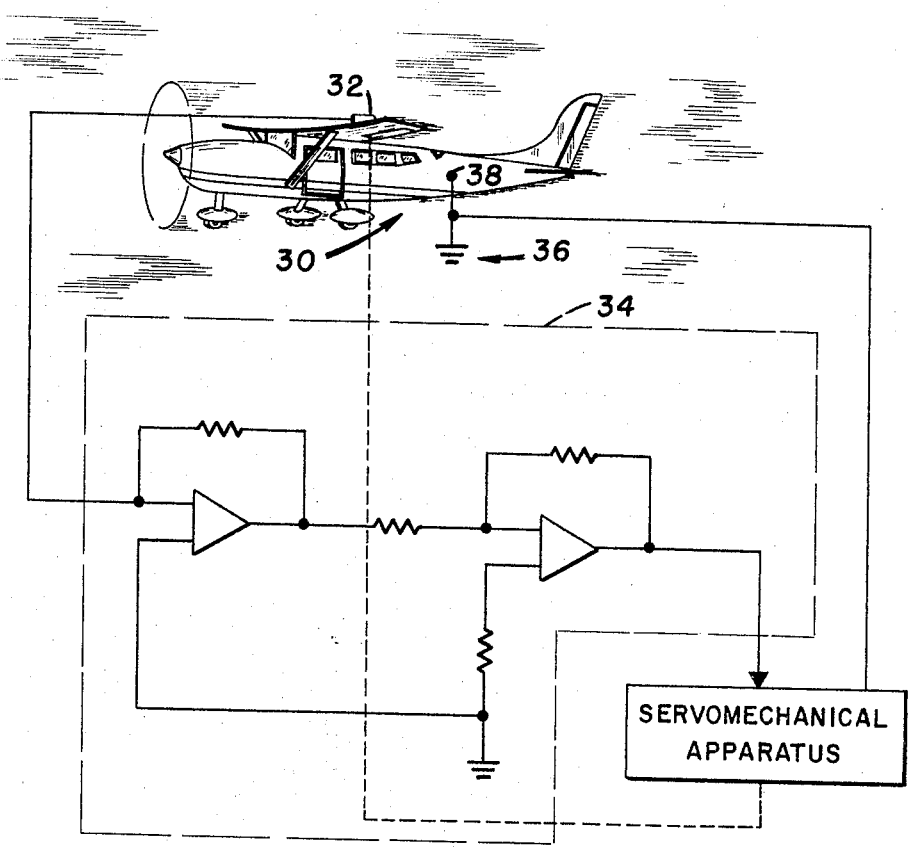

FIG. 2 illustrates an aircraft 30 having a sensing probe 32 disposed on a wingtip thereof and connected to a current meter 34 which is referenced to ground 36 at the "electrostatic center" 38 of the aircraft. The probe 32 may be a simple metal plate which is isolated from the airframe but connected to ground through the current meter 34. The current meter 34 then produces an output signal which is a function of the roll rate of the aircraft 30. If the probe 32 is disposed on the fuselage of the aircraft 30, the output of the current meter would be a function of the pitch rate of the aircraft. This rate information can be used to stabilize the aircraft 30 in a fashion similar to that described previously, or may be used to provide information to a pilot. If a quantity of radioactive material be disposed over the surface of the probe 32 in a well-known fashion, a steady state current proportional to attitude is superimposed on the roll rate information produced by the current meter 34. This steady state current depends on the surface area of the probe and the amount of radioactive material used. Thus, desirable combinations of the two signal functions may be generated by a convenient parametric choice of probe surface area and probe radioactivity to optimize stabilization capability.

Two probes such as the probes 16 and 32 referenced to the electrostatic center of an aircraft can thus be used to stabilize an aircraft about both its roll and pitch axes or to provide information relative to the attitude of the aircraft. The apparatus described may also be used for measuring the fluctuations in the electrostatic charge on the airframe of an aircraft. Such information proves useful as an additional input when stabilizing an aircraft according to the method disclosed by Hill in U.S. patent application, Ser. No. 301,363, filed Oct. 27, 1972, wherein at least two voltage sensing probes are used with a differential amplifier for aircraft stabilization. When an airframe of an aircraft takes on an electrostatic charge, the electrostatic field in the atmosphere is distorted in a non-symmetrical fashion, thereby causing errors to be encountered in the practice of the aforesaid Hill method. By measuring the charge on the airframe, compensation for this background distortion can be made.

Two voltage sensing probes such as the two probes 16 and 32 may be referenced to the electrostatic center of an aircraft to define an equipotential plane in the electrostatic field existing in the earth's atmosphere. The equipotential plane thus defined is essentially parallel to the earth's surface, thereby creating an "artificial" horizontal plane which can be utilized for stabilization of an airborne vehicle as described above or as a reference to provide information to a pilot or other user of the described system. The invention thus contemplates in one preferred form the utilization of the earth's static potential gradient to provide roll attitude and roll rate and/or pitch attitude and pitch rate information in the form of an easily applied DC signal.

Use of the invention as an aircraft stabilization system requires provision for signal gain adjustment at altitudes greater than a few thousand feet. For example, the amplitude of the signals obtained from the voltmeter 12 at 10,000 feet above the earth's surface is decreased five-fold relative to signal amplitude at an altitude of 3,000 feet. This decrease in signal strength occurs due to the change in the static potential gradient with respect to altitude, the static potential gradient at sea level typically being about 180 volts/meter and as low as 10 to 20 volts/meter at an altitude of 20,000 feet. Thus, signal adjustment in the form of gain control is necessary to compensate for the decreased magnitude of the static voltage gradient at relatively high altitudes. Gain control may be provided in a number of well-known ways, such as that shown by Hill in his patent application identified hereinabove. The invention may be practiced in a variety of ways, such as by the addition of gain control apparatus, without departing from the scope of the invention as defined by the appended claims.

I claim:

1. Apparatus for detecting the attitude of an airborne vehicle operating in the electrostatic field existing in the earth's atmosphere, comprising:
    probe means mounted on said vehicle and responsive to said electrostatic field;
    ground connection means on said vehicle;
    referencing means electrically connected to the probe means and the ground connection means for comparing the response to the electrostatic field sensed by said probe means to the potential existing at said ground connection means, said referencing means producing an output signal proportional thereto, said output signal indicating alignment between a reference line taken between said probe means and said ground connection means and an equipotential line existing in said earth's electrostatic field.

2. The apparatus of claim 1 and further comprising:
    stabilizing means on said vehicle responsive to said output signal for adjusting the attitude of said vehicle to cause said reference line to align with said equipotential line.

3. The apparatus of claim 1 wherein said probe means comprises an electrostatic voltage sensing probe.

4. The apparatus of claim 1 wherein the probe means is located along the longitudinal axis of the vehicle.

5. The apparatus of claim 1 wherein the probe is located along a transverse axis of the vehicle.

6. The apparatus of claim 1 wherein the referencing means is a voltmeter.

7. The apparatus of claim 1 wherein the referencing means is a current meter.

8. The apparatus of claim 7 wherein the probe means comprises a flat plate of electrically conductive material.

9. The apparatus of claim 1 wherein said probe means comprises a pair of static voltage sensing probes disposed on the airborne vehicle, a first probe and the ground connection means being disposed along a line substantially parallel to the roll axis of the vehicle and a second probe and the ground connection means being disposed along a line substantially parallel to the pitch axis of the vehicle,
    and wherein said referencing means comprises two voltmeters, one of said voltmeters being electrically connected to the first probe and the other of said voltmeters being electrically connected to the second probe, each said voltmeter receiving the potentials sensed by the probes, and comparing said sensed potentials to the potential existing at said ground connection means, each voltmeter further producing an output signal which is proportional to the respective difference in sensed potential between each of the probes and said ground connection means.

10. The apparatus of claim 9 and further comprising:
    means for adjusting the position of each of the probes to cause the output signal of the voltmeters respectively connected thereto to be zero, the vehicle thus being stabilized relative to the equipotential plane in which the probes lie when the output signals of both voltmeters are zero.

11. A method for detecting the attitude of an airborne vehicle operating in the electric field existing in the earth's atmosphere, comprising the steps of:
    sensing the potential of said electrostatic field with probe means responsive to the electrostatic field;
    measuring the potential at a ground connection on the vehicle;
    comparing the potential sensed by said probe means with the potential measured at said ground connection; and
    generating an output signal proportional to the difference in the two potentials, said output signal indicating alignment between a reference line taken between said probe means and said ground connection and an equipotential line existing in said earth's electrostatic field.

12. The method of claim 11 and further comprising the step of:
    adjusting the attitude of said vehicle to cause said reference line to align with the aforesaid equipotential line.

* * * * *